United States Patent
Fujii et al.

(10) Patent No.: US 10,851,889 B2
(45) Date of Patent: Dec. 1, 2020

(54) CONTROL DEVICE AND CONTROL METHOD OF VEHICLE

(71) Applicant: TOYOTA JIDOSHA KABUSHIKI KAISHA, Toyota (JP)

(72) Inventors: Kota Fujii, Nisshin (JP); Atsushi Tabata, Okazaki (JP); Tetsuya Kono, Okazaki (JP); Koichi Okuda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/673,171

(22) Filed: Nov. 4, 2019

(65) Prior Publication Data

US 2020/0208736 A1    Jul. 2, 2020

(30) Foreign Application Priority Data

Dec. 26, 2018 (JP) .................... 2018-243011

(51) Int. Cl.
| | | |
|---|---|---|
| *F16H 61/02* | (2006.01) | |
| *F16H 59/38* | (2006.01) | |
| *B60K 23/00* | (2006.01) | |
| *F16H 61/68* | (2006.01) | |
| *F16H 61/00* | (2006.01) | |

(52) U.S. Cl.
CPC ............ *F16H 61/02* (2013.01); *B60K 23/00* (2013.01); *F16H 59/38* (2013.01); *F16H 61/68* (2013.01); *F16H 2061/0087* (2013.01)

(58) Field of Classification Search
CPC .. F16H 59/38; F16H 61/02; F16H 2061/0075; F16H 2061/0081; F16H 2061/0087; F16H 2342/00; B60W 10/00; B60W 30/14; B60W 30/143; B60W 50/06; B60W 60/00
See application file for complete search history.

(56) References Cited

U.S. PATENT DOCUMENTS

| | | | | |
|---|---|---|---|---|
| 5,758,306 A | * | 5/1998 | Nakamura ........... | B60K 31/047 180/170 |
| 6,047,230 A | * | 4/2000 | Spencer ................ | B62M 25/08 701/57 |

(Continued)

FOREIGN PATENT DOCUMENTS

| | | |
|---|---|---|
| JP | 2003-211996 A | 7/2003 |
| JP | 2006-348985 A | 12/2006 |

*Primary Examiner* — Edwin A Young
(74) *Attorney, Agent, or Firm* — Oblon, McClelland, Maier & Neustadt, L.L.P.

(57) ABSTRACT

While automatic driving control is being performed, traveling in a driving state of a vehicle corresponding to an unconverged region (including an unperformed region and a performed region) is preferentially selected between the traveling in the driving state of the vehicle corresponding to the unconverged region, and traveling in the driving state of the vehicle corresponding to a converged region. As such, learning control that corrects an amount of operation associated with control of the vehicle is performed more easily throughout the entire learning regions regardless of a usage state of the vehicle by a driver. Therefore, it is possible to achieve an appropriate traveling state at an early stage by the learning control that corrects the amount of operation associated with control of the vehicle.

7 Claims, 5 Drawing Sheets

(56) References Cited

U.S. PATENT DOCUMENTS

| | | | | |
|---|---|---|---|---|
| 2003/0036458 A1* | 2/2003 | Tabata | ................ | B60W 30/18 477/107 |
| 2009/0248265 A1* | 10/2009 | Tabata | ................ | B60W 10/08 701/59 |
| 2018/0141562 A1* | 5/2018 | Singhal | ............ | B60W 30/0956 |

* cited by examiner

| AT GEAR STAGE | C1 | C2 | B1 | B2 | F1 |
|---|---|---|---|---|---|
| FIRST GEAR | ◯ | | | △ | ◯ |
| SECOND GEAR | ◯ | | ◯ | | |
| THIRD GEAR | ◯ | ◯ | | | |
| FOURTH GEAR | | ◯ | ◯ | | |

FIG. 6

| AT INPUT TORQUE | 1-2 UPSHIFT | 2-3 UPSHIFT | 3-4 UPSHIFT |
|---|---|---|---|
| 1(MINIMUM) | PA121 | PA231 | PA341 |
| 2 | PA122 | PA232 | PA342 |
| 3 | PA123 | PA233 | PA343 |
| 4 | PA124 | PA234 | PA344 |
| 5 | PA125 | PA235 | PA345 |
| 6 | PA126 | PA236 | PA346 |
| 7 | PA127 | PA237 | PA347 |
| 8 | PA128 | PA238 | PA348 |
| 9 | PA129 | PA239 | PA349 |
| 10(MAXIMUM) | PA1210 | PA2310 | PA3410 |

FIG. 7

| AT INPUT TORQUE | 1-2 UPSHIFT | 2-3 UPSHIFT | 3-4 UPSHIFT |
|---|---|---|---|
| 1(MINIMUM) | PB121 | PB231 | PB341 |
| 2 | PB122 | PB232 | PB342 |
| 3 | PB123 | Pb233 | PB343 |
| 4 | PB124 | PB234 | PB344 |
| 5 | PB125 | PB235 | PB345 |
| 6 | PB126 | PB236 | PB346 |
| 7 | PB127 | PB237 | PB347 |
| 8 | PB128 | PB238 | PB348 |
| 9 | PB129 | PB239 | PB349 |
| 10(MAXIMUM) | PB1210 | PB2310 | PB3410 |

100# CONTROL DEVICE AND CONTROL METHOD OF VEHICLE

INCORPORATION BY REFERENCE

The disclosure of Japanese Patent Application No. 2018-243011 filed on Dec. 26, 2018 including the specification, drawings and abstract is incorporated herein by reference in its entirety.

BACKGROUND

1. Technical Field

The present disclosure relates to a control device of a vehicle provided with a power source and a power transfer device, and a control method of the vehicle.

2. Description of Related Art

A control device of a vehicle provided with a power source and a power transfer device is well known. For example, a gear-shift control device of an automatic transmission for vehicles is described in Japanese Unexamined Patent Application Publication No. 2006-348985 (JP 2006-348985 A). JP 2006-348985 A discloses a technology for correcting, by learning control, engagement pressure of a release-side engagement device based on an overshoot amount of the input rotating speed of the automatic transmission during power-on upshifting of the automatic transmission.

SUMMARY

Here, when correcting, by the learning control, an amount of operation associated with control of a vehicle, it is conceivable to perform the learning control for each of a plurality of learning regions according to a traveling state of the vehicle, such as the vehicle speed. As such, vehicle performance can be improved according to operation of a driver, or the like. However, depending on the driver, a usage situation of the vehicle, for example, a driving style, and the traveling environment, such as a traveling route, may be biased. In such a case, there is a possibility that the learning control that corrects the amount of operation associated with the vehicle control may be biased toward a specific learning region. Then, it may be difficult to improve the vehicle performance.

The present disclosure provides a control device and a control method of a vehicle, which can achieve an appropriate traveling state at an early stage by learning control that corrects an amount of operation associated with control of the vehicle.

A first aspect of the present disclosure is a control device of a vehicle provided with a power source and a power transfer device. The control device includes a driving control unit configured to set a target traveling state and perform automatic driving control by automatically performing acceleration and deceleration based on the target traveling state, and a learning control unit configured to correct, by learning control, an amount of operation associated with control of the vehicle for each of a plurality of learning regions according to a driving state of the vehicle. The driving control unit is configured to, while performing the automatic driving control, preferentially select traveling in the driving state of the vehicle corresponding to unconverged regions between the traveling in the driving state of the vehicle corresponding to the unconverged regions in which the correction of the amount of operation is not converged among the plurality of learning regions and traveling in the driving state of the vehicle corresponding to converged regions in which the correction of the amount of operation is converged among the plurality of learning regions.

Further, the driving control unit may preferentially select traveling in the driving state of the vehicle corresponding to an unperformed region between the traveling in the driving state of the vehicle corresponding to the unperformed region in which the amount of operation has never been corrected among the unconverged regions and traveling in the driving state of the vehicle corresponding to a performed region in which the amount of operation has been corrected at least one or more times among the unconverged regions.

Moreover, the driving control unit may change, while performing the automatic driving control, the driving state of the vehicle to the driving state of the vehicle that implements the selected traveling.

In addition, the driving control unit may change, when it is impossible to change to the driving state of the vehicle that implements the selected traveling on a current traveling route in the automatic driving control, the current traveling route to another traveling route that implements the selected traveling.

Moreover, the driving control unit may change, while performing the automatic driving control, a current traveling route to another traveling route that implements the selected traveling.

Further, the driving control unit may perform, while performing the automatic driving control, a predetermined driving mode that promotes establishment of a learning permission condition for permitting the learning control of the learning control unit.

According to the first aspect of the present disclosure, while performing the automatic driving control, traveling in the driving state of the vehicle corresponding to the unconverged regions is preferentially selected between the traveling in the driving state of the vehicle corresponding to the unconverged regions of the plurality of learning regions according to the driving state of the vehicle, and traveling in the driving state of the vehicle corresponding to the converged regions of the learning regions. As such, the learning control that corrects the amount of operation associated with the vehicle control is performed more easily throughout the entire learning regions regardless of a usage situation of the vehicle by a driver. Therefore, it is possible to achieve an appropriate traveling state at an early stage by the learning control that corrects the amount of operation associated with the vehicle control.

In addition, according to the first aspect of the present disclosure, traveling in the driving state of the vehicle corresponding to the unperformed region is preferentially selected between traveling in the driving state of the vehicle corresponding to the unperformed region among the unconverged regions, and traveling in the driving state of the vehicle corresponding to the performed region among the unconverged regions. As such, it is possible to perform the learning control at an early stage in the learning regions in which the amount of operation associated with the vehicle control has never been corrected.

Further, according to the first aspect of the present disclosure, while the automatic driving control is being performed, the driving state of the vehicle is changed to the driving state of the vehicle that implements the selected traveling. As such, it is possible to promote the learning control in the unconverged region.

Moreover, according to the first aspect of the present disclosure, when it is impossible to change to the driving state of the vehicle that implements the selected traveling on the current traveling route in the automatic driving control, the current traveling route is changed to another traveling route that implements the selected traveling. As such, it is possible to implement the traveling in which the learning control can be performed in the unconverged region.

Further, according to the first aspect of the present disclosure, while the automatic driving control is being performed, the current traveling route is changed to another traveling route that implements the selected traveling. As such, it is possible to implement the traveling in which the learning control can be performed in the unconverged region. Accordingly, it is possible to promote the learning control in the unconverged region.

In addition, according to the first aspect of the present disclosure, while the automatic driving control is being performed, the predetermined driving mode that promotes establishment of the learning permission condition for permitting learning control of the learning control unit is performed. As such, it is possible to perform the learning control at an early stage.

A second aspect of the present disclosure is a control method of a vehicle provided with a power source and a power transfer device. The control method includes a step of setting a target traveling state and performing automatic driving control by automatically performing acceleration and deceleration based on the target traveling state, and a step of correcting, by learning control, an amount of operation associated with control of the vehicle for each of a plurality of learning regions according to a driving state of the vehicle. While performing the automatic driving control, traveling in the driving state of the vehicle corresponding to unconverged regions is preferentially selected between the traveling in the driving state of the vehicle corresponding to the unconverged regions in which the correction of the amount of operation is not converged among the plurality of learning regions, and traveling in the driving state of the vehicle corresponding to converged regions in which the correction of the amount of operation is converged among the plurality of learning regions.

BRIEF DESCRIPTION OF THE DRAWINGS

Features, advantages, and technical and industrial significance of exemplary embodiments will be described below with reference to the accompanying drawings, in which like signs denote like elements, and wherein:

FIG. 6 is a table illustrating examples of learning values of a first constant standby pressure;

FIG. 7 is a table illustrating examples of learning values of a second constant standby pressure.

DETAILED DESCRIPTION OF EMBODIMENTS

In the embodiment, a gear-shift ratio in a power transfer device, for example, the gear-shift ratio in a transmission, is "the rotating speed of a rotating member on an input side/the rotating speed of a rotating member on an output side". The high side of this gear-shift ratio is the high vehicle speed side where the gear-shift ratio becomes smaller. On the other hand, the low side of the gear-shift ratio is the low vehicle speed side where the gear-shift ratio becomes greater. For example, the gear-shift ratio of the lowest side is the gear-shift ratio of the lowest vehicle speed side, and is the maximum gear-shift ratio where the gear-shift ratio becomes the largest value.

Hereinafter, the embodiment will be described in detail with reference to the drawings.

Figures 1, 2:
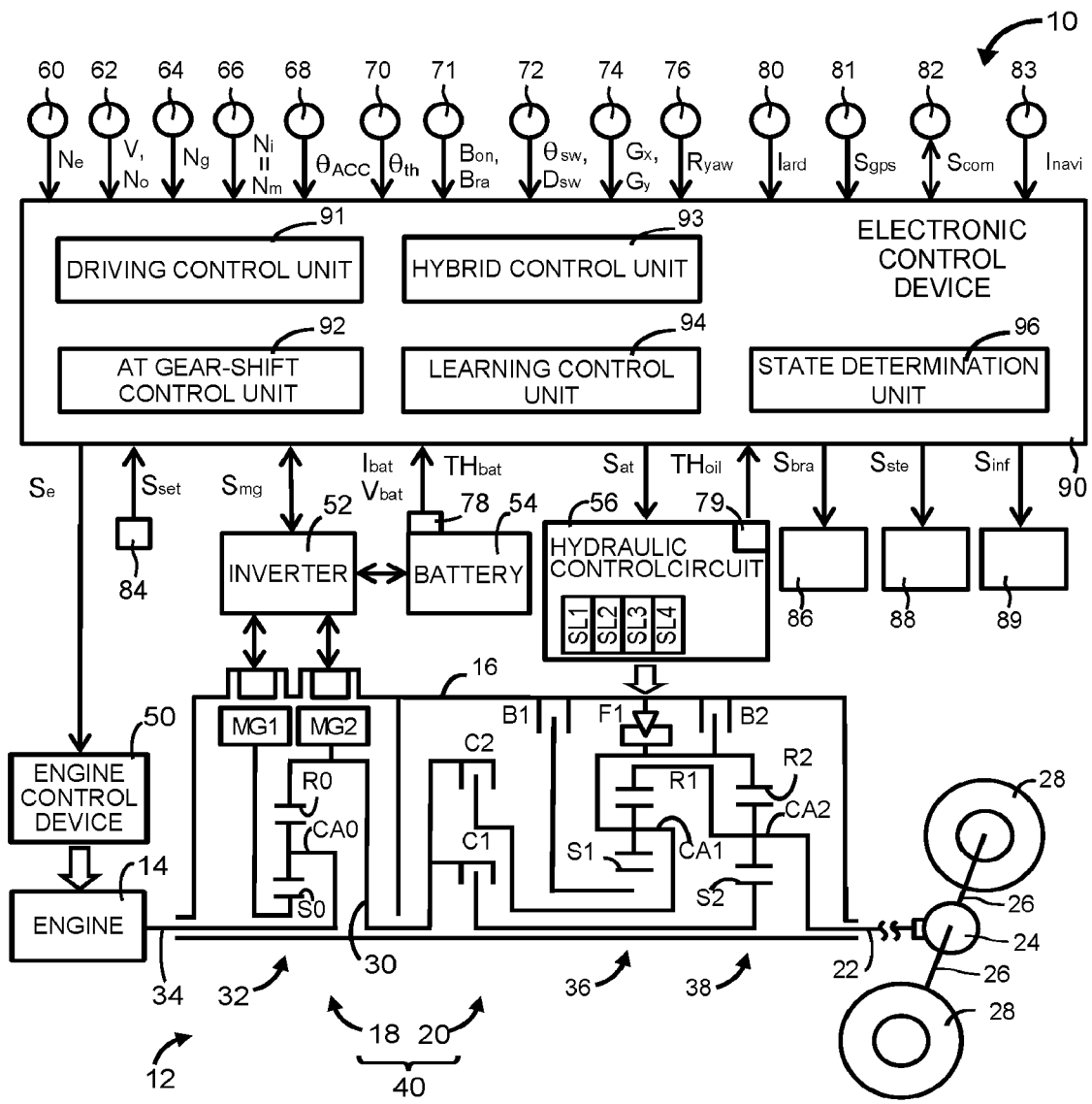
FIG. 1 is a diagram for explaining a schematic configuration of a vehicle and for explaining control functions and main units of a control system for various controls of the vehicle.
FIG. 2 is an operation table for explaining a relationship in a combination of gear-shift operation of a mechanical multi-stage transmission unit illustrated in FIG. 1 and operation of an engagement device used therefor.

FIG. 1 is a diagram for explaining a schematic configuration of a power transfer device 12 provided in a vehicle 10, and for explaining main units of a control system for various controls of the vehicle 10. In FIG. 1, the vehicle 10 includes an engine 14, a first rotating device MG1, and a second rotating device MG2. The power transfer device 12 includes an electric continuously variable transmission unit 18, a mechanical multi-stage transmission unit 20, and the like, which are disposed in series on a common shaft center in a transmission case 16 as a non-rotating member mounted on a vehicle body. The electric continuously variable transmission unit 18 is connected to the engine 14 directly or indirectly via a damper (not shown), and the like. The mechanical multi-stage transmission unit 20 is connected to an output side of the electric continuously variable transmission unit 18. Further, the power transfer device 12 includes a differential gear device 24 connected to an output shaft 22 that is an output rotating member of the mechanical multi-stage transmission unit 20, a pair of axles 26 connected to the differential gear device 24, and the like. In the power transfer device 12, the power output from the engine 14 or the second rotating device MG2 is transferred to the mechanical multi-stage transmission unit 20, and the power is transferred therefrom to the drive wheels 28, provided in the vehicle 10, via the differential gear device 24, and the like. Hereinafter, the transmission case 16, the electric continuously variable transmission unit 18, and the mechanical multi-stage transmission unit 20 will be referred to as the case 16, the continuously variable transmission unit 18, and the multi-stage transmission unit 20, respectively. In addition, power has the same meaning as torque and force unless otherwise specifically distinguished. Further, the continuously variable transmission unit 18, the multi-stage transmission unit 20, and the like, are disposed approximately symmetrically with respect to the common shaft center, and the lower half of the shaft center is omitted in FIG. 1. The common shaft center is a shaft center of a crankshaft of the engine 14, a connecting shaft 34 to be described below, and the like.

The engine 14 functions as a power source capable of generating drive torque, and is, for example, a commonly-known internal-combustion engine, such as a gasoline engine and a diesel engine. In the engine 14, an engine torque $T_e$, which is output torque of the engine 14, is controlled as the engine control device 50, such as a throttle actuator, a fuel injection device, and an ignition device provided in the vehicle 10, is controlled by an electronic control device 90 to be described below. In the present embodiment, the engine 14 is connected to the continuously variable transmission unit 18 directly not via a fluid power transfer device, such as a torque converter and a fluid coupling.

Each of the first rotating device MG1 and the second rotating device MG2 is a rotating electric machine having functions as an electric motor and a generator, and is a so-called motor generator. Each of the first rotating device MG1 and the second rotating device MG2 is connected to a battery 54 as a power storage device provided in the vehicle 10 via an inverter 52 provided in the vehicle 10. As the inverter 52 is controlled by the electronic control device 90 to be described below, an MG1 torque $T_g$ and an MG2 torque $T_m$, which are respectively the output torque of the first rotating device MG1 and the second rotating device MG2, are controlled. The output torque of the rotating device is power running torque at positive torque on an acceleration side, and regenerative torque at negative torque on a deceleration side. The battery 54 is a power storage device that transmits and receives power to and from each of the first rotating device MG1 and the second rotating device MG2.

The continuously variable transmission unit 18 includes a differential mechanism 32 as a power split device that mechanically splits and transfers the power of the first rotating device MG1 and the engine 14 to an intermediate transfer member 30, which is an output rotating member of the first rotating device MG1 and the continuously variable transmission unit 18. The second rotating device MG2 is connected to the intermediate transfer member 30 in a power transferable manner. The continuously variable transmission unit 18 is an electric continuously variable transmission in which, as a driving state of the first rotating device MG1 is controlled, a differential state of the differential mechanism 32 is controlled. The first rotating device MG1 can control the engine rotating speed $N_e$, which is the rotating speed of the engine 14, and corresponds to a differential rotating device. The second rotating device MG2 functions as a power source capable of generating drive torque, and corresponds to a drive rotating device for traveling. The vehicle 10 is a hybrid vehicle provided with the engine 14 and the second rotating device MG2 as a power source for traveling. The power transfer device 12 transfers the power of the power source to the drive wheels 28. Note that controlling the driving state of the first rotating device MG1 is performing driving control of the first rotating device MG1.

The differential mechanism 32 is constituted with a single pinion-type planetary gear device, and includes a sun gear S0, a carrier CA0, and a ring gear R0. The engine 14 is connected to the carrier CA0 via the connecting shaft 34 in a power transferable manner, the first rotating device MG1 is connected to the sun gear S0 in a power transferable manner, and the second rotating device MG2 is connected to the ring gear R0 in a power transferable manner. In the differential mechanism 32, the carrier CA0 functions as an input element, the sun gear S0 functions as a reaction force element, and the ring gear R0 functions as an output element.

The multi-stage transmission unit 20 is a mechanical gear-shift mechanism as a multi-stage transmission that constitutes a part of a power transfer path between the intermediate transfer member 30 and the drive wheels 28, that is, between the continuously variable transmission unit 18 and the drive wheels 28. The intermediate transfer member 30 also functions as an input rotating member of the multi-stage transmission unit 20. Since the second rotating device MG2 is connected to the intermediate transfer member 30 so as to rotate integrally, or since the engine 14 is connected to an input side of the continuously variable transmission unit 18, the multi-stage transmission unit 20 constitutes a part of a power transfer path between the power source (the second rotating device MG2 or the engine 14) and the drive wheels 28. The intermediate transfer member 30 transfers the power of the power source to the drive wheels 28. The multi-stage transmission unit 20 is a commonly-known planetary gear-type automatic transmission, including, for example, a plurality of sets of a first planetary gear device 36 and a second planetary gear device 38, and a plurality of engagement devices including a clutch C1, a clutch C2, a brake B1, and a brake B2 as well as a one-way clutch F1. Hereinafter, the clutch C1, the clutch C2, the brake B1, and the brake B2 will be simply referred to as an engagement device CB unless otherwise specifically distinguished.

The engagement device CB is a hydraulic friction engagement device, constituted with a multi-plate or single-plate clutch or brake pressurized by a hydraulic actuator, a band brake tightened by the hydraulic actuator, or the like. As engagement torque $T_{cb}$, which is torque capacity of each engagement hydraulic pressure $PR_{cb}$, is changed by the engagement hydraulic pressure $PR_{cb}$ as engagement pressure of each engagement device CB, which is adjusted and which is output from each of solenoid valves SL1 to SL4 in the hydraulic control circuit 56 provided in the vehicle 10, an operation state of each engagement device CB is switched among an engagement state, a release state, and the like.

In the multi-stage transmission unit 20, respective rotating elements of the first planetary gear device 36 and the second planetary gear device 38 are partially connected to each other directly, or indirectly via the engagement device CB or the one-way clutch F1, or connected to the intermediate transfer member 30, the case 16, or the output shaft 22. Respective rotating elements of the first planetary gear device 36 are a sun gear S1, a carrier CA1, and a ring gear R1, and respective rotating elements of the second planetary gear device 38 are a sun gear S2, a carrier CA2, and a ring gear R2.

The multi-stage transmission unit 20 is a multi-stage transmission in which any one of a plurality of shift stages (also referred to as gear stages) having different shift ratios (also referred to as gear ratios) $\gamma_{at}$ (=the AT input rotating speed $N_i$/the output rotating speed $N_o$) is formed by engagement of any one of a plurality of engagement devices, for example, a predetermined engagement device. In other words, in the multi-stage transmission unit 20, the gear stage is switched, that is, gear-shift is performed by engagement of any one of the plurality of engagement devices. The multi-stage transmission unit 20 is a multi-stage automatic transmission in which each of the plurality of gear stages is formed. In the present embodiment, the gear stage formed in the multi-stage transmission unit 20 is referred to as an AT gear step. The AT input rotating speed $N_i$ is the input rotating speed of the multi-stage transmission unit 20 that is the rotating speed of the input rotating member of the multi-stage transmission unit 20, and has the same value as the rotating speed of the intermediate transfer member 30 and as the MG2 rotating speed $N_m$ that is the rotating speed of the second rotating device MG2. The AT input rotating speed $N_i$ can be represented by the MG2 rotating speed $N_m$. The output rotating speed $N_o$ is the rotating speed of the output shaft 22 that is the output rotating speed of the multi-stage transmission unit 20, and is also the output rotating speed of a composite transmission 40 that is an integrated transmission in which the continuously variable transmission unit 18 and the multi-stage transmission unit 20 are combined. The composite transmission 40 constitutes a part of a power transfer path between the engine 14 and the drive wheels 28.

For example, as illustrated in the engagement operation table of FIG. 2, in the multi-stage transmission unit 20, four gear AT gear stages for forward movement, from an AT1 speed gear stage ("1st" in the table) to an AT4 speed gear stage ("4th" in the table), are formed as plurality of AT gear stages. The shift ratio $\gamma_{at}$ of the AT1 speed gear stage is the largest, and the shift ratio $\gamma_{at}$ becomes smaller as the AT gear stage is on a higher side. The engagement operation table of FIG. 2 summarizes a relationship between each AT gear stage and each operation state of the plurality of engagement devices. In other words, the engagement operation table of FIG. 2 summarizes the relationship between each AT gear stage and a predetermined engagement device that is an engagement device engaged in each AT gear stage. In FIG. 2, "O" represents engagement, "Δ" represents engagement at the time of engine braking or a coast downshift of the multi-stage transmission unit 20, and a blank represents release.

In the multi-stage transmission unit 20, the AT gear stage, formed according to operation of the accelerator by a driver, the vehicle speed V, and the like, is switched, that is, the plurality of AT gear stages are selectively formed by the electronic control device 90 to be described below. For example, in the gear-shift control of the multi-stage transmission unit 20, a so-called clutch-to-clutch gear-shift is performed in which gear-shift is performed by re-clamping of any one of the engagement devices CB, that is, gear-shift is performed by switching between engagement and release of the engagement device CB. In the present embodiment, for example, the downshift from the AT2 speed gear stage to the AT1 speed gear step is represented by a 2→1 downshift. The same applies to other upshifts and downshifts.

Figure 3:
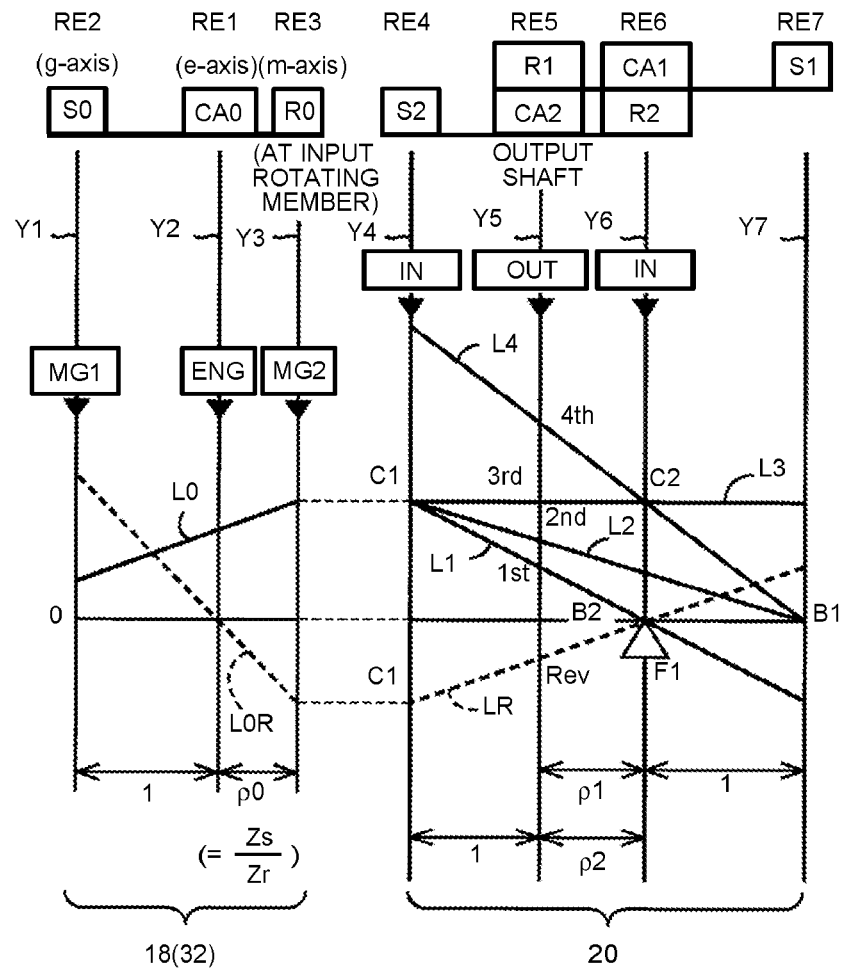
FIG. 3 is a collinear diagram illustrating a relative relationship between the rotating speed of each rotating element in an electric continuously variable transmission unit and the mechanical multi-stage transmission unit.

FIG. 3 is a collinear diagram illustrating a relative relationship between the rotating speed of each rotating element in the continuously variable transmission unit 18 and the multi-stage transmission unit 20. As illustrated in FIG. 3, three longitudinal lines Y1, Y2, Y3 corresponding to the three rotating elements of the differential mechanism 32 constituting the continuously variable transmission unit 18 are, in order from the left side, a g-axis representing the rotating speed of the sun gear S0 corresponding to a second rotating element RE2, an e-axis representing the rotating speed of the carrier CA0 corresponding to a first rotating element RE1, and an m-axis representing the rotating speed of the ring gear R0 (that is, the input rotating speed of the multi-stage transmission unit 20) corresponding to a third rotating element RE3. Further, each of four longitudinal lines Y4, Y5, Y6, Y7 of the multi-stage transmission unit 20 is an axis representing, in order from the left side, the rotating speed of the sun gear S2 corresponding to a fourth rotating element RE4, the rotating speed of the ring gear R1 and the carrier CA2 (that is, the rotating speed of the output shaft 22), which are connected to each other and corresponding to a fifth rotating element RE5, the rotating speed of the carrier CA1 and the ring gear R2, which are connected to each other and corresponding to a sixth rotating element RE6, and the rotating speed of the sun gear S1 corresponding to a seventh rotating element RE7. The distances between each of the longitudinal lines Y1, Y2, Y3 are determined according to the gear ratio ρ0 of the differential mechanism 32. Further, the distances between each of the longitudinal lines Y4, Y5, Y6, Y7 are determined according to the gear ratios ρ1, ρ2 of the first and second planetary gear devices 36, 38. In the collinear diagram, when the distance between the longitudinal lines corresponding to the sun gear and the carrier corresponds to "1", the distance between the longitudinal lines corresponding to the carrier and the ring gear corresponds to the gear ratio ρ of the planetary gear device (=the number of teeth of the sun gear $Z_s$/the number of teeth of the ring gear $Z_r$).

As represented by the collinear diagram of FIG. 3, in the differential mechanism 32 of the continuously variable transmission unit 18, the engine 14 (see "ENG" in the diagram) is connected to the first rotating element RE1, the first rotating device MG1 (see "MG1" in the diagram) is connected to the second rotating element RE2, and the second rotating device MG2 (see "MG2" in the diagram) is connected to the third rotating element RE3 that rotates integrally with the intermediate transfer member 30 so that the rotation of the engine 14 can be transferred to the multi-stage transmission unit 20 via the intermediate transfer member 30. In the continuously variable transmission unit 18, the relationship between the rotating speed of the sun gear S0 and the rotating speed of the ring gear R0 is represented by straight lines L0, L0R that cross the longitudinal line Y2.

Further, in the multi-stage transmission unit 20, the fourth rotating element RE4 is selectively connected to the intermediate transfer member 30 via the clutch C1, the fifth rotating element RE5 is connected to the output shaft 22, the sixth rotating element RE6 is selectively connected to the intermediate transfer member 30 via the clutch C2 and selectively connected to the case 16 via the brake B2, and the seventh rotating element RE7 is selectively connected to the case 16 via the brake B1. In the multi-stage transmission unit 20, the rotating speed of each of "1st", "2nd", "3rd", "4th", "Rev" in the output shaft 22 is represented by straight lines L1, L2, L3, L4, LR that cross the longitudinal line Y5 according to control for engagement and release of the engagement device CB.

The straight line L0 and the straight lines L1, L2, L3, L4 shown by solid lines of FIG. 3 represent the relative speed of the respective rotating elements in forward traveling in hybrid traveling mode in which hybrid traveling that uses at least the engine 14 as a power source can be performed. In this hybrid traveling mode, when, in the differential mechanism 32, reaction torque, which is negative torque by the first rotating device MG1, is input into the sun gear S0 in positive rotation with respect to the engine torque $T_e$ input into the carrier CA0, when, in the ring gear R0, engine direct transfer torque $T_d$ $(=T_e/(1+\rho 0)=-(1/\rho 0)\times T_g)$, which becomes positive torque in positive rotation, occurs. Thereafter, according to the required drive force, combined torque of the engine direct transfer torque $T_d$ and the MG2 torque $T_m$ is transferred to the drive wheels 28, as the drive torque in the forward direction of the vehicle 10, via the multi-stage transmission unit 20 in which any one of the AT1 speed gear stage to AT4 speed gear stage is formed. Here, the first rotating device MG1 functions as a generator that generates negative torque in positive rotation. Generated power $W_g$ of the first rotating device MG1 is charged to the battery 54 or consumed at the second rotating device MG2. The second rotating device MG2 outputs the MG2 torque $T_m$ using all or part of the generated power $W_g$, or using the power from the battery 54 in addition to the generated power $W_g$.

Although not shown in FIG. 3, in the collinear diagram of motor traveling mode in which motor traveling that stops the engine 14 and simultaneously uses the second rotating device MG2 as a power source can be performed, in the differential mechanism 32, the carrier CA0 becomes zero rotation and the MG2 torque $T_m$ that becomes positive torque in positive rotation is input into the ring gear R0. Here, the first rotating device MG1 connected to the sun gear S0 becomes a no-load state and idles in negative rotation. That is, in the motor traveling mode, the engine 14 is not driven, the engine rotating speed $N_e$ becomes zero, and the MG2 torque $T_m$ is transferred to the drive wheels 28, as the drive torque in the forward direction of the vehicle 10, via the multi-stage transmission unit 20 in which any one of the AT1 speed gear stage to AT4 speed gear stage is formed. Here, the MG2 torque $T_m$ is the power running torque of the positive rotation.

Straight lines L0R, LR shown by dotted lines in FIG. 3 represent the relative speed of the respective rotating elements in reverse traveling in the motor traveling mode. In the reverse traveling in this motor traveling mode, the MG2 torque $T_m$, which becomes negative torque in the negative rotation, is input into the ring gear R0, and the MG2 torque $T_m$, is transferred, to the drive wheels 28, as the drive torque in the reverse direction of the vehicle 10, via the multi-stage transmission unit 20 in which the AT1 speed gear stage is formed. The vehicle 10 can perform the reverse traveling in a state in which, for example, the AT1 gear stage that is a low-side AT gear stage for forward movement among a plurality of AT gear stages is formed by the electronic control device 90 to be described below, as reverse MG2 torque $T_m$ of which positive and negative is opposite to that of forward MG2 torque $T_m$ in forward traveling is positively output from the second rotating device MG2. Here, the forward MG2 torque $T_m$ is the power running torque that becomes positive torque in positive rotation, and the reverse MG2 torque $T_m$ is the power running torque that becomes negative torque in the negative rotation. As such, the vehicle 10 performs the reverse traveling by reversing the positive and negative of the MG2 torque $T_m$, using the AT gear stage for forward movement. Using the AT gear stage for forward movement means using the same AT gear stage as when performing the forward traveling. In addition, also in the hybrid traveling mode, since it is possible to cause the second rotating device MG2 to perform the negative rotation as shown by the straight line L0R, the reverse traveling can be performed in a manner similar to the motor traveling mode.

The power transfer device 12 is provided with the continuously variable transmission unit 18 as an electric gear-shift mechanism, which includes the differential mechanism 32 of which differential state is controlled by controlling of the driving state of the first rotating device MG1. The differential mechanism 32 has three rotating elements that are the carrier CA0 as the first rotating element RE1 to which the engine 14 is connected in a power transferable manner, the sun gear S0 as the second rotating element RE2 to which the first rotating device MG1 is connected in a power transferable manner, and the ring gear R0 as the third rotating element RE3 to which the intermediate transfer member 30 is connected. The third rotating element RE3 to which the intermediate transfer member 30 is connected is, from a different point of view, the third rotating element RE3 to which the second rotating device MG2 is connected in a power transferable manner. In other words, the power transfer device 12 is provided with the continuously variable transmission unit 18 including the differential mechanism 32 to which the engine 14 is connected in a power transferable manner and the first rotating device MG1 connected to the differential mechanism 32 in a power transferable manner, and in the continuously variable transmission unit 18, the differential state of the differential mechanism 32 is controlled by the controlling of the driving state of the first rotating device MG 1. The continuously variable transmission unit 18 is operated as the electronic continuously variable transmission in which the gear-shift ratio $\gamma_0$ ($=N_e/N_m$) representing a value of a ratio of the engine rotating speed $N_e$ equal to the rotating speed of the connecting shaft 34 serving as the input rotating member, to the MG2 rotating speed $N_m$ which is the rotating speed of the intermediate transfer member 30 serving as the output rotating member is changed.

For example, in the hybrid traveling mode, with respect to the rotating speed of the ring gear R0, which is restrained by the rotation of the drive wheels 28 as the AT gear stage is formed at the multi-stage transmission unit 20, when the rotating speed of the sun gear S0 is increased or decreased by control of the rotating speed of the first rotating device MG1, the rotating speed of the carrier CA0, that is, the engine rotating speed $N_e$, is increased or decreased. Thus, in the hybrid traveling, it is possible to operate the engine 14 at a driving point with good efficiency. That is, it is possible to configure the entire composite transmission 40 as a continuously variable transmission with the multi-stage transmission unit 20 in which the AT gear is formed and the continuously variable transmission unit 18 operating as a continuously variable transmission. Here, the continuously variable transmission unit 18 and the multi-stage transmission unit 20 are arranged in series.

Alternatively, since it is possible to perform gear-shift of the continuously variable transmission unit 18 like the multi-stage transmission, gear-shift of the entire composite transmission 40 can be performed like the multi-stage transmission with the multi-stage transmission unit 20 in which the AT gear is formed and the continuously variable transmission unit 18 on which gear-shift is performed like the multi-stage transmission. In other words, in the composite transmission 40, the multi-stage transmission unit 20 and the continuously variable transmission unit 18 can be controlled so that a plurality of gear stages, having different gear-shift ratios $\gamma_t$ ($=N_e/N_o$) representing values of the ratios of the engine rotating speed $N_e$ to the output rotating speed $N_o$, can be selectively established. In the present embodiment, the gear stage established at the composite transmission 40 is referred to as a simulated gear stage. The gear-shift ratio $\gamma_t$ is a total shift ratio formed by the continuously variable transmission unit 18 and the multi-stage transmission unit 20 arranged in series, and is a value ($\gamma_t = \gamma_o \times \gamma_{at}$) obtained by multiplying the gear-shift ratio $\gamma_o$ of the continuously variable transmission unit 18 by the gear-shift ratio $\gamma_{at}$ of the multi-stage transmission unit 20.

The simulated gear stage is allocated, for example, by a combination of each AT gear stage of the multi-stage transmission unit 20 and gear-shift ratios $\gamma_o$ of one or more types of the continuously variable transmission units 18 so that one or more types of simulated gear stages can be established for each of the AT gear stages of the multi-stage transmission unit 20. For example, it is predetermined that a simulated speed 1 gear stage to a simulated speed 3 gear stage are established for the AT1 speed gear stage, a simulated speed 4 gear stage to a simulated speed 6 gear stage are established for the AT2 speed gear stage, a simulated speed 7 gear stage to a simulated speed 9 gear stage are established for the AT3 speed gear stage, and a simulated speed 10 gear stage is established for the AT4 speed gear stage. In the composite transmission 40, a different simulated gear stage is established for any one AT gear stage by controlling the continuously variable transmission unit 18 so that the engine rotating speed $N_e$ can achieve a predetermined gear-shift ratio $\gamma_t$ to the output rotating speed $N_o$. Further, in the composite transmission 40, the simulated gear stage is switched by controlling the continuously variable transmission unit 18 according to the switching of the AT gear stage.

Returning to FIG. 1, the vehicle 10 includes an electronic control device 90 as a controller including a control device of the vehicle 10 associated with control of the engine 14, the continuously variable transmission unit 18, the multi-stage transmission unit 20, and the like. Thus, FIG. 1 is a diagram illustrating an input and output system of the electronic control device 90, and a functional block diagram for explaining main units of control functions by the electronic control device 90. The electronic control device 90 includes, for example, a so-called microcomputer including a CPU, a RAM, a ROM, an input and output interface, and the like. The CPU performs various controls on the vehicle 10 by performing signal processing according to a program stored in the ROM in advance while using a temporary storage function of the RAM. The electronic control device 90 is constituted separately for engine control, gear-shift control, and the like, as necessary.

The electronic control device 90 is supplied with various signals, and the like, based on a value detected by various sensors, and the like, provided in the vehicle 10, respectively. Examples of the various signals include the engine rotating speed $N_e$, the output rotating speed $N_o$ corresponding to the vehicle speed V, the MG1 rotating speed $N_g$ which is the rotating speed of the first rotating device MG1, the MG2 rotating speed $N_m$ which is the AT input rotating speed $N_i$, an accelerator opening degree $\theta_{acc}$ as an amount of acceleration operation by the driver, representing the magnitude of acceleration operation by the driver, a throttle valve opening degree $\theta_{th}$ which is an opening degree of the electronic throttle valve, a brake-on signal $B_{on}$, representing a state in which the brake pedal for operating a wheel brake is operated by the driver, a brake operation amount $B_{ra}$, representing the magnitude of depression operation of the brake pedal by the driver corresponding to the depression force on the brake pedal, a steering angle $\theta_{sw}$ and the steering direction $D_{sw}$ of the steering wheel provided in the vehicle 10, the longitudinal acceleration $G_x$ of the vehicle 10, the lateral acceleration $G_y$ of the vehicle 10, a yaw rate $R_{yaw}$ which is the rotating angular velocity around the vertical axis of the vehicle 10, the battery temperature $TH_{bat}$, battery charge and discharge current $I_{bat}$, and battery voltage $V_{bat}$ of the battery 54, the operation oil temperature $TH_{oil}$ which is the temperature of the operation oil supplied to an hydraulic actuator of the engagement device CB, that is, the operation oil for operating the engagement device CB, vehicle surroundings information $I_{ard}$, a GPS signal (an orbit signal) $S_{gps}$, a communication signal $S_{com}$, navigation information $L_{navi}$, and a driving support setting signal $S_{set}$ which is a signal representing the setting by the driver in the driving support control, such as automatic driving control and cruise control. In addition, examples of the various sensors include an engine rotating speed sensor 60, an output rotating speed sensor 62, an MG1 rotating speed sensor 64, an MG2 rotating speed sensor 66, an accelerator opening degree sensor 68, a throttle valve opening degree sensor 70, a brake pedal sensor 71, a steering sensor 72, a G sensor 74, a yaw rate sensor 76, a battery sensor 78, an oil temperature sensor 79, a vehicle surroundings information sensor 80, a GPS antenna 81, an external network communication antenna 82, a navigation system 83, and a driving support setting switch group 84.

The amount of acceleration operation by the driver, representing the magnitude of acceleration operation by the driver, is for example, an accelerator operation amount which is an amount of operating an accelerator operation member, such as an accelerator pedal, and is an amount of output required by the driver for the vehicle 10. As the output amount required by the driver, a throttle valve opening degree $\theta_{th}$, or the like, can be used in addition to the accelerator opening degree $\theta_{acc}$.

The vehicle surroundings information sensor 80 includes, for example, at least one of a LIDAR, a radar, an in-vehicle camera, and the like, and directly acquires information on a road on which the vehicle 10 is traveling and information on an object existing around the vehicle. The vehicle surroundings information sensor 80 may include, for example, a plurality of LIDARs each detecting an object in front, on a side, at the back of the vehicle 10, or the like, or a single LIDAR detecting an object all around the vehicle 10, and each LIDAR outputs the information on the detected object as the vehicle surroundings information $I_{ard}$. The vehicle surroundings information sensor 80 may include, for example, a plurality of radars each detecting an object in front, near the front, near the back of the vehicle 10, or the like, and outputting the information on the detected object as the vehicle surroundings information $I_{ard}$. The information on the object detected by the LIDAR or the radar includes the distance and the direction from the detected object to the vehicle 10. The in-vehicle camera is, for example, a monocular camera or a stereo camera that is provided inside a windshield of the vehicle 10, capturing an image in the front of the vehicle 10, and outputs captured image information as the vehicle surroundings information $I_{ard}$. The captured image information includes information on, for example, a lane, sign, other vehicles, pedestrians, and obstacles of the road on which the vehicle 10 travels.

The driving support setting switch group 84 includes an automatic driving selection switch for performing the automatic driving control, a cruise switch for performing the cruise control, a switch for setting the vehicle speed in the cruise control, a switch for setting a distance with a preceding vehicle in the cruise control, a switch for performing lane keep control for traveling while maintaining a set lane, and the like.

The GPS signal $S_{gps}$ includes subject vehicle position information indicating the position of the vehicle 10 on the ground surface or a map based on a signal transmitted by a global positioning system (GPS) satellite.

The communication signal $S_{com}$ includes, for example, road traffic information transmitted to and received from a center that is a device outside the vehicle 10, such as a server and a road traffic information communication system, and/or inter-vehicle communication information, directly transmitted to and received from other vehicles in the vicinity of the vehicle 10. Examples of the road traffic information include information on traffic congestion, accidents, roadwork, required time on the road, and a parking lot. Examples of the inter-vehicle communication information include vehicle information, traveling information, and traffic environment information. Examples of the vehicle information include information indicating a vehicle type, such as a passenger car, a truck, and a two-wheeled vehicle. Examples of the traveling information include information on the vehicle speed V, position information, information on operation of a brake pedal, information on a blink of a turn signal lamp, and information on a blink of a hazard lamp. Examples of the traffic environment information include information on traffic congestion and roadwork on the road.

The navigation information $I_{navi}$ includes, for example, map information, such as road information and facility information based on map data stored in advance in the navigation system 83. Examples of the road information include a type of road, such as an urban road, a suburban road, a mountain road, and a high speed vehicle road which is an expressway, bifurcating or merging of roads, a slope of a road, and a speed limit. Examples of the facility information include a type of a place, such as a supermarket, a shop, a restaurant, a parking lot, a park, a place for repairing the vehicle 10, a home, and a service area on an expressway, and a location and a name of the place. The above service area is, for example, a place with facilities for parking, dining and refueling, and the like, on the expressway.

The navigation system 83 is a commonly-known navigation system having a display, a speaker, and the like. Based on the GPS signal $S_{gps}$, the navigation system 83 specifies the position of the subject vehicle on the map data stored in advance. The navigation system 83 displays the position of the subject vehicle on the map displayed on the display. When a destination is input, the navigation system 83 calculates a traveling route from a departure point to the destination, and displays, for the driver, the traveling route, and the like, via the display, the speaker, and the like.

From the electronic control device 90, various command signals are output to each of the devices provided in the vehicle 10. Examples of the various command signals include an engine control command signal $S_e$ for controlling the engine 14, a rotating device control command signal $S_{mg}$ for controlling each of the first rotating device MG1 and the second rotating device MG2, a hydraulic control command signal $S_{at}$ for controlling the operation state of the engagement device CB, a communication signal $S_{com}$, a brake control command signal $S_{bra}$ for controlling braking torque by the wheel brake, a steering control command signal $S_{ste}$ for controlling the steering of the wheel (specifically, a front wheel), and an information provision control command signal $S_{inf}$ for providing a warning or notification to the driver. Examples of the devices provided in the vehicle 10 include an engine control device 50, the inverter 52, the hydraulic control circuit 56, the external network communication antenna 82, a wheel brake device 86, a steering device 88, and an information provision device 89.

The wheel brake device 86 applies the braking torque by the wheel brake to the wheel. The wheel brake device 86 supplies hydraulic brake pressure to a wheel cylinder provided in the wheel brake in response to, for example, the depression operation of the brake pedal by the driver. Normally, in the wheel brake device 86, master cylinder hydraulic pressure, generated from a brake master cylinder and having a magnitude corresponding to the depression force on the brake pedal, is directly supplied to the wheel cylinder as the hydraulic brake pressure. On the other hand, in the wheel brake device 86, at the time of, for example, ABS control, side slip suppression control, vehicle speed control, the automatic driving control, and the like, the hydraulic brake pressure necessary for each control is supplied to the wheel cylinder for generating the braking torque by the wheel brake. The wheel is a drive wheel 28 and an idler wheel (not shown).

The steering device 88 applies assist torque to a steering system of the vehicle 10 according to, for example, the vehicle speed V, the steering angle $\theta_{sw}$, the steering direction $D_{sw}$, and the yaw rate $R_{yaw}$. The steering device 88 applies torque for controlling the steering of the front wheel to the steering system of the vehicle 10 at the time of, for example, the automatic driving control.

The information provision device 89 provides a warning or notification to the driver when, for example, a part associated with the traveling of the vehicle 10 is broken or a function of the part deteriorates. Examples of the information provision device 89 include a display device, such as a monitor, a display, and an alarm lamp, and/or an audio output device, such as a speaker and a buzzer. The display device provides a visual warning or notification to the driver. The audio output device provides an audio warning or notification to the driver.

The electronic control device 90 calculates a state of charge SOC (%) as a value indicating the charge state of the battery 54 based on, for example, the battery charge and discharge current $I_{bat}$ and the battery voltage $V_{bat}$. Further, the electronic control device 90 calculates chargeable and dischargeable power $W_{in}$, $W_{out}$ that defines the usable range of battery power $P_{bat}$ which is the power of the battery 54 based on, for example, the battery temperature $TH_{bat}$ and the state of charge SOC of the battery 54. The chargeable and dischargeable power $W_{in}$, $W_{out}$ are chargeable power $W_{in}$ as inputtable power that defines a limitation of input power of the battery 54, and dischargeable power $W_{out}$ as outputtable power that defines a limitation of output power of the battery 54. For example, the chargeable and dischargeable power $W_{in}$, $W_{out}$ becomes smaller as the battery temperature $TH_{bat}$ is lower in a low temperature range where the battery temperature $TH_{bat}$ is lower than the normal usage range, and becomes smaller as the battery temperature $TH_{bat}$ is higher in a high temperature range where the battery temperature $TH_{bat}$ is higher than the normal usage range. Further, the chargeable power $W_{in}$ becomes smaller, for example, as the state of charge SOC is higher in a range where the state of charge SOC is high. Moreover, the dischargeable power $W_{out}$ becomes smaller, for example, as the state of charge SOC is lower in a range where the state of charge SOC is low.

To perform various controls in the vehicle 10, the electronic control device 90 includes a driving control unit 91 that is a driving controller, an AT gear-shift control unit 92 that is an AT gear controller, and a hybrid control unit 93 that is a hybrid controller.

As the driving control of the vehicle 10, the driving control unit 91 can selectively perform manual driving control for traveling based on driving operation of the driver, and the automatic driving control for traveling by automatically setting a target traveling state based on, for example, a destination or map information input by the driver, and based on the target traveling state, by automatically accelerating, decelerating, and steering. The manual driving control is the driving control for traveling by manual driving according to the driver's driving operation. The manual driving is a driving method in which the vehicle 10 normally travels according to the driver's driving operation, such as an accelerator operation, a brake operation, and a steering operation. The automatic driving control is driving control for traveling by automatic driving. The automatic driving is a driving method in which the vehicle 10 travels by automatically accelerating, decelerating, braking, steering and the like, according to the control by the electronic control device 90 based on a signal or information from various sensors, instead of the driver's driving operation (intention).

When the automatic driving is not selected on the automatic driving selection switch in the driving support setting switch group 84, the driving control unit 91 establishes manual driving mode and performs the manual driving control. The driving control unit 91 performs the manual driving control by outputting commands for controlling each of the multi-stage transmission unit 20, the engine 14, and the rotating devices MG1, MG2 to the AT gear-shift control unit 92 and the hybrid control unit 93.

When the automatic driving is selected by the driver's operation on the automatic driving selection switch in the driving support setting switch group 84, the driving control unit 91 establishes automatic driving mode and performs the automatic driving control. Specifically, the driving control unit 91 automatically sets the target traveling state based on various settings, such as the destination, fuel consumption priority, the vehicle speed, and the inter-vehicle distance, which are input by the driver, position information of the subject vehicle based on the GPS signal $S_{gps}$, the map information, such as road conditions including curves, and the like, the slope, the altitude, a legal speed limit, infrastructure information, weather, and the like, based on navigation information $I_{navi}$ and/or the communication signal $S_{com}$, and information on the lane, sign, other vehicles, pedestrians, or the like of the road on which the vehicle 10 travels, based on the vehicle surroundings information $I_{ard}$. The driving control unit 91 performs the automatic driving control by automatically accelerating, decelerating, braking, and steering based on the set target traveling state. The acceleration and deceleration are performed by the vehicle 10, and the deceleration may include braking.

The driving control unit 91 sets, as the target traveling state, a target vehicle speed in consideration of a safety margin based on a target route, a target course, an actual inter-vehicle distance, and the like, a target drive torque or the target acceleration and deceleration based on the target vehicle speed, a traveling resistance, or the like. For the traveling resistance, for example, a value set in advance for the vehicle 10 by the driver, a value based on the map information acquired by communication with the outside of the vehicle 10, a value based on vehicle specifications, an estimated value that is calculated based on the slope, an actual drive amount, an actual longitudinal acceleration $G_x$, or the like, during traveling, is used. The driving control unit 91 outputs, to the AT gear-shift control unit 92 and the hybrid control unit 93, a command for controlling each of the multi-stage transmission unit 20, engine 14, or rotating devices MG1, MG2 so that the target drive torque can be obtained. When the target drive torque is a negative value, that is, when the braking torque is required, at least one of the engine brake torque by the engine 14, regenerative brake torque by the second rotating device MG2, or the wheel brake torque by the wheel brake device 86 is applied to the vehicle 10. For example, the driving control unit 91 calculates the wheel brake torque in an available range, and outputs, to the wheel brake device 86, the brake control command signal $S_{bra}$ for applying the wheel brake torque so that the target drive torque can be obtained. In addition, the driving control unit 91 outputs, to the steering device 88, the steering control command signal $S_{ste}$ for controlling the steering of the front wheels based on the set target traveling state.

Hereinafter, the control by the AT gear-shift control unit 92 and the hybrid control unit 93 will be specifically described by exemplifying the case of manual driving control by normal traveling.

Figure 4:
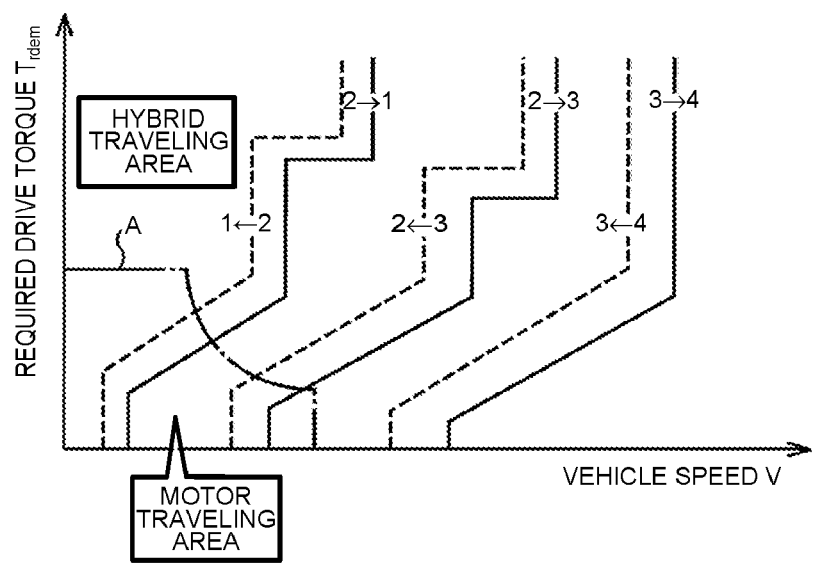
FIG. 4 is a graph illustrating an example of a gear-shift map used for gear-shift control of the multi-stage transmission unit, and a power source switch map used for controlling switching between hybrid traveling and motor traveling, and a relationship between the gear-shift map and the power source switch map.

The AT gear-shift control unit 92 determines, and controls if necessary, gear-shift of the multi-stage transmission unit 20, using a relationship that has been obtained experimentally in advance or by design, and stored, that is, a predetermined relationship, for example, an AT gear stage shift map as illustrated in FIG. 4. For the gear-shift control of the multi-stage transmission unit 20, the AT gear-shift control unit 92 outputs, to the hydraulic control circuit 56, the hydraulic control command signal $S_{at}$ for switching between engagement and release states of the engagement device CB by the solenoid valves SL1 to SL4 so that the AT gear stage of the multi-stage transmission unit 20 can be automatically switched. The AT gear stage gear-shift map shows a predetermined relationship having gear-shift lines for determining gear-shift of the multi-stage transmission unit 20 on two-dimensional coordinates using, for example, the vehicle speed V and the required drive torque $T_{rdem}$ as variables. Here, the output rotating speed $N_o$, or the like, may be used instead of the vehicle speed V, and the required drive force $F_{rdem}$, the accelerator opening degree $\theta_{acc}$, the throttle valve opening degree $\theta_{th}$, or the like, may be used instead of the required drive torque $T_{rdem}$. Each shift line in the AT gear stage shift map is an upshift line for determining an upshift as represented by the solid line and a downshift line for determining a downshift as represented by the dotted line.

The hybrid control unit 93 includes a function as an engine controller for controlling the operation of the engine 14, that is, an engine control unit, and a function as a rotating device controller for controlling, via the inverter 52, the operation of the first rotating device MG1 and the second rotating device MG2, that is, a rotating device control unit. By these controlling functions, the hybrid control unit 93 performs hybrid drive control, and the like, via the engine 14, the first rotating device MG1, and the second rotating device MG2. The hybrid control unit 93 calculates the required drive torque $T_{rdem}$ ($N_m$) at the drive wheels 28 as a drive required amount by applying the accelerator opening degree $\theta_{acc}$ and the vehicle speed V to a predetermined relationship that is, for example, a required drive amount map. As the drive required amount, required drive force $F_{rdem}$ (N) at the drive wheels 28, required drive power $P_{rdem}$ (W) at the drive wheels 28, required AT output torque at the output shaft 22, and the like, can be used in addition to the required drive torque $T_{rdem}$. In addition, the target drive torque in the automatic driving control has the same meaning as the required drive torque in the manual driving control.

The hybrid control unit 93 outputs the engine control command signal $S_e$ that is a command signal for controlling the engine 14, and a rotating device control command signal $S_{mg}$ that is a command signal for controlling the first rotating device MG1 and the second rotating device MG2 in consideration of the chargeable and dischargeable powers $W_{in}$, $W_{out}$, and the like, of the battery 54, so as to implement the required drive power $P_{rdem}$. The engine control command signal $S_e$ is, for example, a command value of the engine power $P_e$ that is the power of the engine 14 that outputs the engine torque $T_e$ at the engine rotating speed $N_e$ at the time. The rotating device control command signal $S_{mg}$ is, for example, a command value of the generated power $W_g$ of the first rotating device MG1 that outputs the MG1 torque $T_g$, as the reaction torque to the engine torque $T_e$, at the MG1 rotating speed $N_g$ when the command is output, and a command value of the consumed power $W_m$ of the second rotating device MG2 that outputs the MG2 torque $T_m$ at the MG2 rotating speed $N_m$ when the command is output.

For example, when operating the entire composite transmission 40 is operated as a continuously variable transmission by operating the continuously variable transmission unit 18 as a continuously variable transmission, the hybrid control unit 93 controls the continuously variable transmission of the continuously variable transmission unit 18 to change the gear-shift ratio $\gamma_0$ of the continuously variable transmission unit 18, by controlling the engine 14 so that the engine rotating speed $N_e$ and the engine torque $T_e$ can be obtained to achieve the engine power $P_e$ that implements the required drive power $P_{rdem}$ in consideration of the optimum fuel consumption point of the engine 14, and the like, and controlling the generated power $W_g$ of the first rotating device MG1. As a result of this control, the gear-shift ratio $\gamma_t$ of the composite transmission 40 when operated as a continuously variable transmission is controlled.

For example, when performing gear-shift of the entire composite transmission 40 like a multi-stage transmission by performing gear-shift of the continuously variable transmission 18 like the multi-stage transmission, the hybrid control unit 93 determines gear-shift of the composite transmission 40 using a predetermined relationship, for example, a simulated gear stage shift map, and performs gear-shift control of the continuously variable transmission 18 so as to selectively establish a plurality of simulated gear stages, in cooperation with the shifting control of the AT gear stage of the multi-stage transmission unit 20 by the AT gear-shift control unit 92. The plurality of simulated gear stages can be established by controlling the engine rotating speed $N_e$ by the first rotating device MG1 according to the vehicle speed V so as to maintain the respective gear-shift ratios $\gamma_t$. The gear-shift ratio $\gamma_t$ of each simulated gear stage does not necessarily have to be a constant value throughout the entire range of the vehicle speed V, may be changed in a predetermined range, and may be limited by, for example, an upper or lower limit of the rotating speed of each unit. As such, the hybrid control unit 93 can perform gear-shift control that changes the engine rotating speed $N_e$ like the multi-stage transmission. The simulated multi-stage gear-shift control for performing gear-shift of the entire composite transmission 40 like a multi-stage transmission may be performed in preference to the continuously variable transmission control that operates the entire composite transmission 40 as the continuously variable transmission when, for example, traveling mode focusing on traveling performance, such as sports traveling mode, is selected by the driver, or the required drive torque $T_{rdem}$ is relatively large. However, the simulated multi-stage gear-shift control may be basically performed without a predetermined performance limit.

The hybrid control unit 93 selectively establishes the motor traveling mode or the hybrid traveling mode as the traveling mode according to the traveling state. For example, when the required drive power $P_{rdem}$ is in a hybrid traveling area where it is equal to or greater than a predetermined threshold, the hybrid control unit 93 establishes the hybrid traveling mode while when the required drive power $P_{rdem}$ is in a motor traveling area where it is smaller than the predetermined threshold, the hybrid control unit 93 establishes the motor traveling mode. A dash-dot-dash line A in FIG. 4 is a boundary line for determining whether the power source for traveling of the vehicle 10 is at least the engine 14 or the second rotating device MG2 only. In other words, the dash-dot-dash line A in FIG. 4 is a boundary line between the hybrid traveling area and the motor traveling area for switching between the hybrid traveling and the motor traveling. The predetermined relationship having a boundary line as represented by the dash-dot-dash line A in FIG. 4 is an example of a power source switching map constituted with two-dimensional coordinates having the vehicle speed V and the required drive torque $T_{rdem}$ as variables. In FIG. 4, for convenience, the power source switching map is illustrated together with the AT gear stage shift map.

Even when the required drive power $P_{rdem}$ is in the motor traveling area, the hybrid control unit 93 establishes the hybrid traveling mode when the state of charge SOC of the battery 54 is less than a predetermined engine start threshold. The motor traveling mode is a traveling state in which the drive torque is generated by the second rotating device MG2 while the engine 14 is stopped. The hybrid traveling mode is a traveling state in which the engine 14 is being operated. The engine start threshold is a predetermined threshold for determining that the state of charge SOC is required to charge the battery 54 by forcibly starting the engine 14.

When the vehicle state transitions from the motor traveling area to the hybrid traveling area while the operation of the engine 14 is being stopped, or when the state of charge SOC is lower than the engine start threshold, the hybrid control unit 93 establishes the hybrid traveling mode, and performs start control to start the engine 14. The hybrid control unit 93 starts the engine 14 by increasing the engine rotating speed $N_e$ via the first rotating device MG1, and igniting the engine 14 when the engine rotating speed $N_e$ becomes equal to or higher than a predetermined rotating speed at which ignition is possible. In other words, the hybrid control unit 93 starts the engine 14 by cranking the engine 14 via the first rotating device MG1.

Here, the electronic control device 90 further includes a learning control unit 94 as a learning controller for correcting an amount of operation associated with control of the vehicle 10 by learning control for each of a plurality of learning regions according to a driving state of the vehicle 10. The operation amount associated with the control of the vehicle 10 is, for example, a hydraulic pressure instruction value, which is a hydraulic control command signal $S_{at}$ and corresponds to each engagement pressure of the engagement device CB in the gear-shift control of the multi-stage transmission unit 20. In the learning control that corrects the hydraulic pressure instruction value in the gear-shift control of the multi-stage transmission unit 20, the driving state of the vehicle 10 is, for example, a traveling parameter, such as input torque input into the multi-stage transmission unit 20, the vehicle speed V, and the AT gear stage. The input torque input into the multi-stage transmission unit 20 is AT input torque $T_i$ that is combined torque of engine direct transfer torque $T_d$ and the MG2 torque $T_m$. As the traveling parameter, an accelerator opening degree $\theta_{acc}$, and the like, may be used instead of the AT input torque $T_i$.

Figure 5:
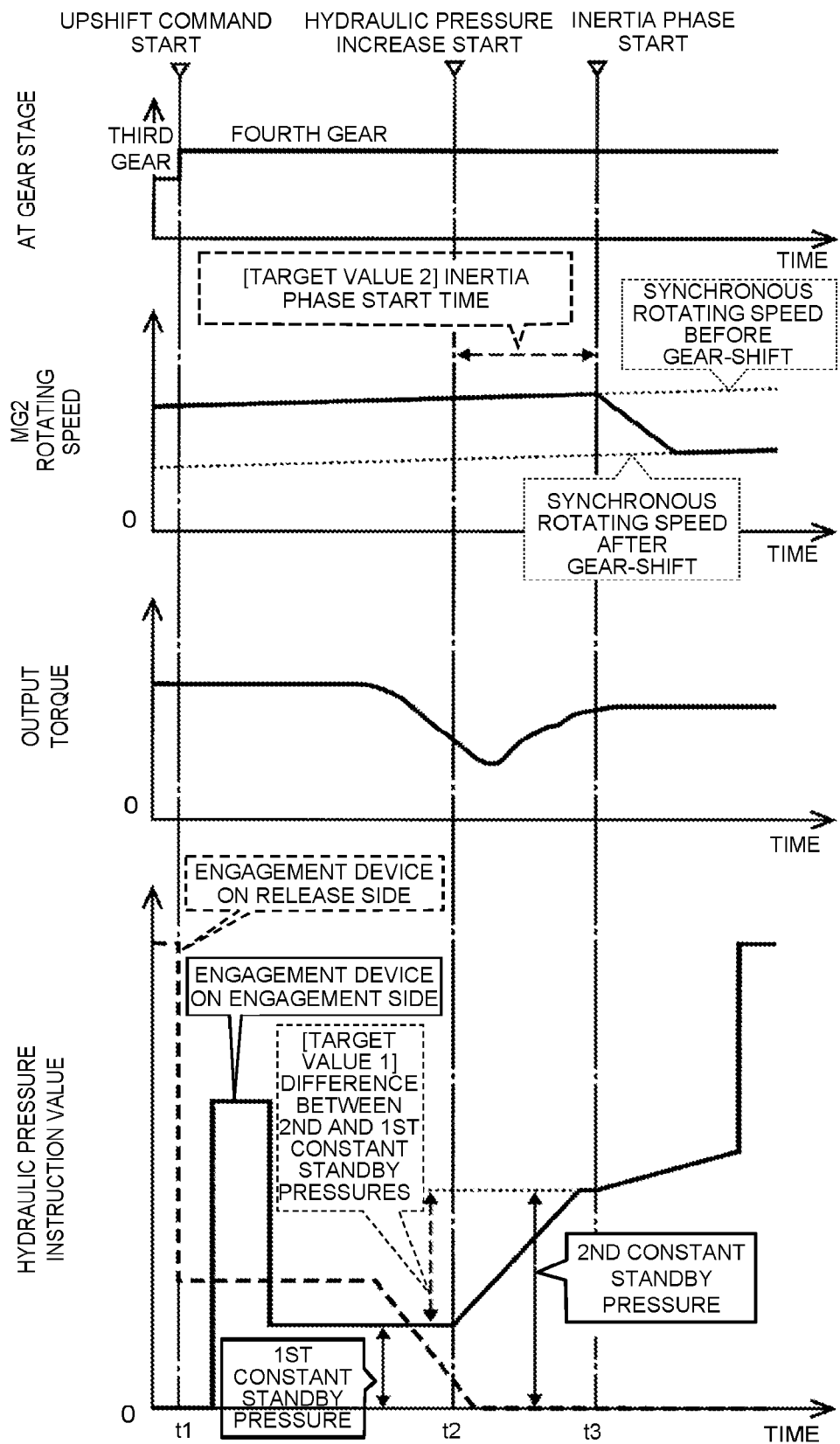
FIG. 5 is a time chart for explaining an example of learning control associated with gear-shift control of the multi-stage transmission unit.

FIG. 5 is a time chart for explaining an example of the learning control on the gear-shift control of the multi-stage transmission unit 20. FIG. 5 illustrates a 3→4 upshift in a power-on state as the gear-shift control of the multi-stage transmission unit 20. In FIG. 5, timepoint t1 represents the timepoint when an output of the hydraulic control command signal $S_{at}$ serving as an upshift command is started. In the hydraulic control command signal $S_{at}$, a hydraulic pressure instruction value (see dotted lines) for gradually decreasing the engagement hydraulic pressure $PR_{c1}$ of the clutch C1 is output so as to release the clutch C1 serving as the engagement device CB on a release side, and a hydraulic pressure instruction value (see solid lines) for gradually increasing the engagement hydraulic pressure $PR_{b1}$ of the brake B1 is output so as to engage the brake B1 serving as the engagement device CB on an engagement side. The learning control that corrects each of a first constant standby pressure after outputting quick charging hydraulic pressure in the hydraulic pressure instruction value of the engagement hydraulic pressure $PR_{b1}$, and a second constant standby pressure after gradually increasing the first constant standby pressure before start of the inertia phase is performed. A target value 1 in this learning control is a standby pressure difference that is a difference between the second constant standby pressure and the first constant standby pressure (=the second constant standby pressure−the first constant standby pressure). A target value 2 is the inertia phase start time that is the time from the timepoint when the first constant standby pressure is gradually increased (see timepoint t2) to the timepoint when the inertia phase is started (see timepoint t3). In this learning control, after completion of the 3→4 upshift, the first constant standby pressure and the second constant standby pressure that are used at the next 3→4 upshift are corrected so that the standby pressure difference and the inertia phase start time in the 3→4 upshift can respectively become predetermined values of the target value 1 and the target value 2. The first constant standby pressure and the second constant standby pressure are corrected for each of the plurality of learning regions according to each of the traveling parameters, such as the AT input torque $T_i$ and the vehicle speed V, and stored as learning values.

FIG. 6 is a table illustrating examples of learning values of the first constant standby pressure. FIG. 7 is a table illustrating examples of learning values of the second constant standby pressure. FIGS. 6 and 7 each illustrates a plurality of learning regions formed by splitting the AT input torque $T_i$ into 10 parts for, for example, every 10(%). The gear-shift of the multi-stage transmission unit 20 is split into three groups, of a 1→2 upshift, a 2→3 upshift, and a 3→4 upshift. The learning values of the first constant standby pressure and the learning values of the second constant standby pressure in the upshift of the multi-stage transmission unit 20 are stored in each of 30 blocks according to the type of gear-shift. At the beginning when the correction by the learning control has never been performed, a predetermined initial value (a default value) is stored in each block. Then, whenever the learning control is performed, the value of the block corresponding to the learning regions at the time of the performance of the learning control is set to the latest learning value. The learning condition is established when the change in the AT input torque $T_i$ stays within the region of one block during the performance of the upshift of the multi-stage transmission unit 20, and the learning control is performed.

The learning control unit 94 performs the learning control that corrects the operation amount associated with the control of the vehicle 10 in any one of the manual driving mode and the automatic driving mode. However, depending on the driver, a usage situation of the vehicle 10, such as a driving style and the traveling route, may be biased. In such a case, it is difficult to obtain an opportunity for the learning control in the entire plurality of learning regions. For example, when the frequency of a specific operation by the driver is high, or when the frequency of traveling on the same traveling route is high, the usage situation easily has a tendency to be biased to a specific accelerator opening degree $\theta_{acc}$, vehicle speed V, operation oil temperature $TH_{oil}$, brake operation amount $B_{ra}$, and AT gear stage. As a result, there may be a learning region where the learning control is not performed, or it may take time until the learning value converges, which may make it difficult to improve performance of the vehicle 10. Therefore, it is desirable that the learning control is performed throughout the entire learning regions at an early stage.

The vehicle 10 can travel by automatic driving control. In the automatic driving control, the target traveling state can be set without being restrained by the usage situation of the vehicle 10 by the driver. Therefore, while the automatic driving control is being performed, the electronic control device 90 preferentially performs the traveling in the driving state of the vehicle 10 corresponding to the learning region where it is difficult to obtain the learning control opportunity in the usage situation of the vehicle 10 by the driver.

Specifically, the electronic control device 90 further includes a state determination unit 96 as a state determination tool so as to implement a control function of achieving an appropriate traveling state at an early stage by the learning control.

Based on whether the automatic driving mode is established by the driving control unit 91, the state determination unit 96 determines whether the state of the vehicle 10 is set to the automatic driving mode.

When determining that the state of the vehicle 10 is set to the automatic driving mode, the state determination unit 96 determines whether there is an unperformed region among the plurality of learning regions according to the driving state of the vehicle 10. When determining that there is no unperformed region, the state determination unit 96 determines whether there is a performed region among the plurality of learning regions according to the driving state of the vehicle 10. The unperformed region is a learning region in which the correction of the operation amount associated with the control of the vehicle 10 has never been performed among the unconverged regions. The performed region is a learning region in which the correction of the operation amount associated with the control of the vehicle 10 has been performed at least one or more times among the unconverged regions. The unconverged regions are learning regions in which the correction of the operation amount associated with the control of the vehicle 10 is not converged among the plurality of learning regions according to the driving state of the vehicle 10. A combined region of the unperformed region and the performed region among the plurality of learning regions becomes the unconverged region. A learning region other than the unconverged region among the plurality of learning regions according to the driving state of the vehicle 10 is a converged region. The converged region is a learning region in which the correction of the operation amount associated with the control of the vehicle 10 among the plurality of learning regions according to the driving state of the vehicle 10 is converged. The fact that the correction of the operation amount is converged means that a change in the learning value has become less than a predetermined change before and after the performance of the learning control, and that the learning value has become stable, that is, the learning value that is a value after the correction of the operation amount is converged.

While the automatic driving control is being performed, when the state determination unit 96 determines that there is the unperformed region or there is the performed region, that is, when the state determination unit 96 determines that there is the unconverged region, the operation control unit 91 performs traveling in the driving state of the vehicle 10 corresponding to the unconverged region. While the automatic driving control is being performed, when the state determination unit 96 determines that there is no unperformed region and there is no performed region, that is, when the state determination unit 96 determines that there is no unconverged region, the driving control unit 91 continues the current state by the automatic driving control. As such, while the automatic driving control is being performed, the driving control unit 91 preferentially selects the traveling in the driving state of the vehicle 10 corresponding to the unconverged region between the traveling in the driving state of the vehicle 10 corresponding to the unconverged region and the traveling in the driving state of the vehicle corresponding to the converged region.

While the automatic driving control is being performed, when the state determination unit 96 determines that there is the unperformed region, the driving control unit 91 performs the traveling in the driving state of the vehicle 10 corresponding to the unperformed region. While the automatic driving control is being performed, when the state determination unit 96 determines that there is no unperformed region but there is the performed region, the driving control unit 91 performs the traveling in the driving state of the vehicle 10 corresponding to the performed region. As such, while the automatic driving control is being performed, the driving control unit 91 preferentially selects the traveling in the driving state of the vehicle 10 corresponding to the unperformed region between the traveling in the driving state of the vehicle 10 corresponding to the unperformed region and the traveling in the driving state of the vehicle corresponding to the performed region.

In case the current state by the automatic driving control is continued, if it is impossible to perform the traveling in the driving state of the vehicle 10 corresponding to the unconverged region, and thus the learning control in the unconverged region is impossible, the traveling performance of the vehicle 10 needs to be changed. Here, the traveling performance of the vehicle 10 is, for example, the target drive torque in the automatic driving control. When the target drive torque is changed, the longitudinal acceleration $G_x$ is changed. For example, the driving control unit 91 changes the driving performance by, for example, changing the target drive torque more slowly than the normal times on the current target route. As such, the driving control unit 91 can change the traveling parameter, such as the AT input torque $T_i$ and the vehicle speed V, that is, the driving state of the vehicle 10 with respect to the normal times. Here, since the change in the traveling parameter is a change with respect to the normal time, the traveling parameter may be changed with respect to the normal time as the vehicle speed V is maintained substantially constant by force, or as the AT input torque $T_i$ becomes substantially constant. Alternatively, the driving control unit 91 changes the target drive torque on the current target route to the target drive torque on another target route by changing the current target route to another target route. As such, the driving control unit 91 can change the traveling performance. When the target route is changed, the target drive torque becomes the normal target drive torque on the changed target route.

The above-described suggestion can be applied to each of the unperformed region and the performed region included in the unconverged region. While the automatic driving control is being performed, the driving control unit 91 changes the driving state of the vehicle 10 to the driving state of the vehicle 10 that implements the selected traveling. Alternatively, while the automatic driving control is being performed, the driving control unit 91 changes the current traveling route to another traveling route that implements the selected traveling.

When changing the traveling performance, it is better not to change the traveling route as much as possible. When the driving control unit 91 cannot change to the driving state of the vehicle 10 that implements the selected traveling on the current traveling route in the automatic driving control, the driving control unit 91 changes the current traveling route in the automatic driving control to another traveling route that implements traveling.

Since a learning permission condition for permitting the learning control is more likely to be established while the automatic driving control is being performed than while the manual driving control is being performed, the learning control in the unconverged region is more likely to be performed. While the automatic driving control is being performed, the driving control unit 91 performs a predetermined driving mode that promotes establishment of the learning permission condition for permitting the learning control of the learning control unit 94. The learning permission condition is, for example, a condition that the operation oil temperature $TH_{oil}$ is equal to or higher than a predetermined oil temperature. The predetermined oil temperature is, for example, an upper limit value in a low oil temperature range that is predetermined as a range of the operation oil temperature $TH_{oil}$ in which the hydraulic pressure responsiveness of the engagement device CB is likely to deteriorate. While the automatic driving control is being performed, the driving control unit 91 performs a driving mode in which the operation oil temperature $TH_{oil}$ is increased, as the predetermined driving mode.

Figure 8:
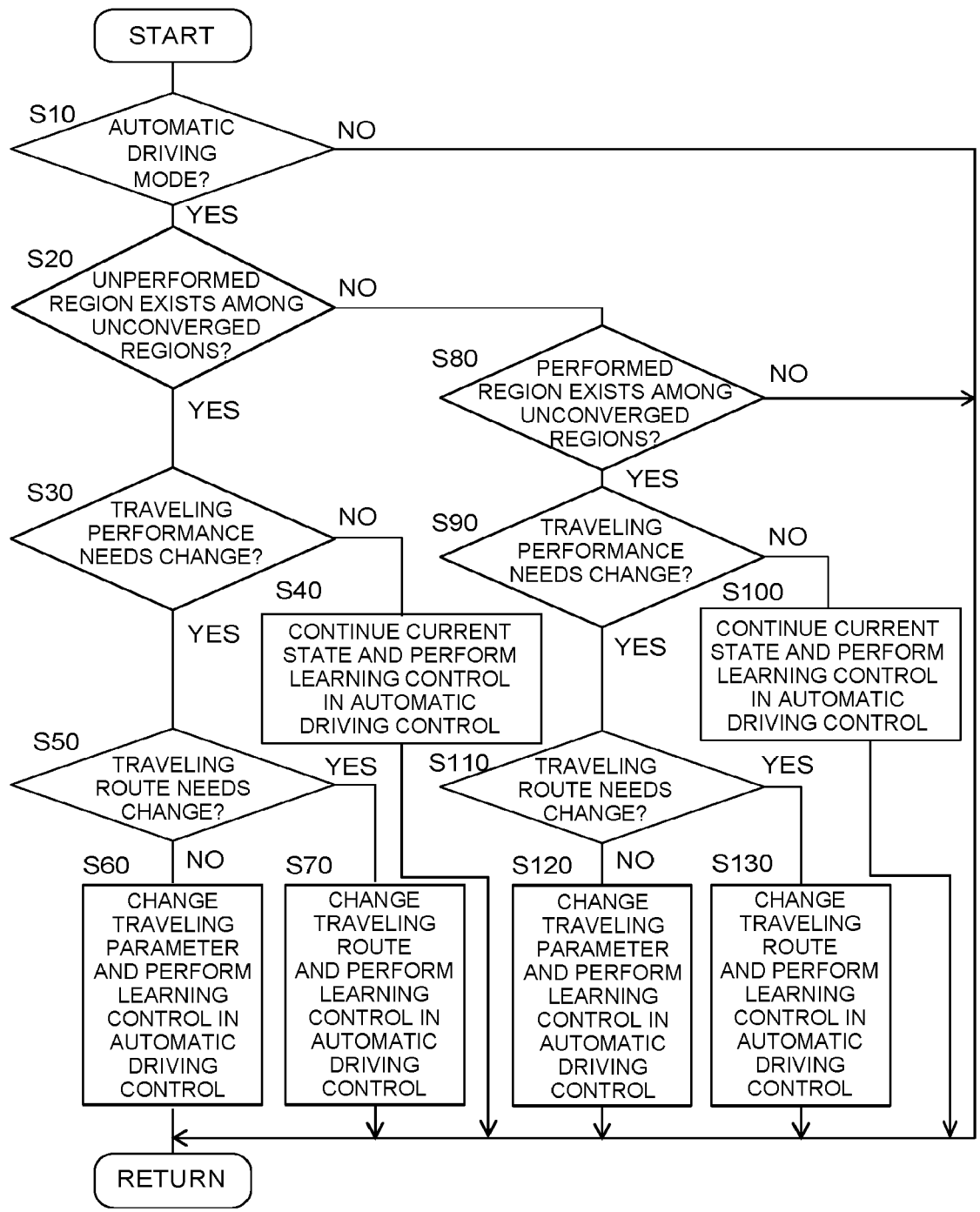
FIG. 8 is a flowchart for explaining the main part of a control operation of an electronic control unit, that is, a control operation for achieving an appropriate traveling state at an early stage by the learning control that corrects an amount of operation associated with vehicle control.

FIG. 8 is a flowchart for explaining the main part of a control operation of an electronic control device 90, that is, a control operation for achieving an appropriate traveling state at an early stage by the learning control that corrects an amount of operation associated with the control of the vehicle 10, and the control operation is, for example, performed repeatedly.

In FIG. 8, first, in step S10 (hereinafter, "step" is omitted) corresponding to a function of the state determination unit 96, it is determined whether the state of the vehicle 10 is set to the automatic driving mode. When the determination of S10 is negative, this routine is terminated. When the determination of S10 is affirmative, in S20 corresponding to the function of the state determination unit 96, it is determined whether there is the unperformed region among the unconverged regions. When the determination of S20 is affirmative, in S30 corresponding to the function of the state determination unit 96, it is determined whether the traveling performance of the vehicle 10 needs to be changed. In other words, it is determined whether the learning control in the unperformed region is not performed in the current state by the automatic driving control. When the determination of S30 is negative, in S40 corresponding to the functions of the driving control unit 91 and the learning control unit 94, the current state by the automatic driving control is continued and the learning control in the unperformed region is performed in the traveling by the automatic driving control in the driving state of the vehicle 10 corresponding to the unperformed region. When the determination in S30 is affirmative, in S50 corresponding to the function of the state determination unit 96, it is determined whether the traveling route needs to be changed. In other words, it is determined whether it is impossible to change to the driving state of the vehicle 10 corresponding to the unperformed region on the current traveling route. When the determination of S50 is negative, in S60 corresponding to the functions of the driving control unit 91 and the learning control unit 94, the traveling parameter, such as the AT input torque $T_i$ and the vehicle speed V, is changed with respect to the normal time on the current target route, the vehicle 10 is made to travel in the driving state corresponding to the unperformed region, and the learning control in the unperformed region is performed in the automatic driving control. When the determination of S50 is affirmative, in S70 corresponding to the functions of the driving control unit 91 and the learning control unit 94, the current target route is changed to another target route, that is, the traveling route is changed, the vehicle 10 is made to travel in the driving state corresponding to the unperformed region, and the learning control in the unperformed region is performed in the automatic driving control. When the determination of S20 is negative, in S80 corresponding to the function of the state determination unit 96, it is determined whether there is the performed region among the unconverged regions. When the determination of S80 is negative, this routine is terminated. When the determination of S80 is affirmative, in S90 corresponding to the function of the state determination unit 96, it is determined whether the traveling performance of the vehicle 10 needs to be changed. In other words, it is determined whether the learning control in the performed region is not performed in the current state by the automatic driving control. When the determination of S90 is negative, in S100 corresponding to the functions of the driving control unit 91 and the learning control unit 94, the current state by the automatic driving control is continued, and the learning control in the performed region is performed in the traveling by the automatic driving control in the driving state of the vehicle 10 corresponding to the performed region. When the determination in S90 is affirmative, in S110 corresponding to the function of the state determination unit 96, it is determined whether the traveling route needs to be changed. In other words, it is determined whether it is impossible to change to the driving state of the vehicle 10 corresponding to the unperformed region on the current traveling route. When the determination of S110 is negative, in S120 corresponding to the functions of the driving control unit 91 and the learning control unit 94, the traveling parameter, such as the AT input torque $T_i$ and the vehicle speed V, is changed with respect to the normal time on the current target route, the vehicle 10 is made to travel in the driving state corresponding to the performed region, and the learning control in the performed region is performed in the automatic driving control. When the determination of S110 is affirmative, in S130 corresponding to the functions of the driving control unit 91 and the learning control unit 94, the traveling route is changed, the vehicle 10 is made to travel in the driving state corresponding to the performed region, and the learning control in the performed region is performed in the automatic driving control.

As described above, according to the present embodiment, while the automatic driving control is being performed, the traveling in the driving state of the vehicle 10 corresponding to the unconverged region is preferentially selected between the traveling in the driving state of the vehicle 10 corresponding to the unconverged region and the traveling in the driving state of the vehicle 10 corresponding to the converged region. Thus, the learning control that corrects the operation amount associated with the control of the vehicle 10 is performed more easily throughout the entire learning regions regardless of the usage situation of the vehicle 10 by the driver. Therefore, it is possible to achieve an appropriate traveling state at an early stage by the learning control that corrects the operation amount associated with the control of the vehicle 10.

Moreover, according to the present embodiment, since the traveling in the driving state of the vehicle 10 corresponding to the unperformed region is preferentially selected between the traveling in the driving state of the vehicle 10 corresponding to the unperformed region and the traveling in the driving state of the vehicle 10 corresponding to the performed region, it is possible to perform the learning control at an early stage in the learning region in which the correction of the operation amount associated with the control of the vehicle 10 has never performed.

Further, according to the present embodiment, while the automatic driving control is being performed, since the driving state of the vehicle 10 is changed to the driving state of the vehicle 10 that implements the selected traveling, the learning control in the unconverged region can be promoted. Moreover, the learning control can be proceeded in an appropriate order. As such, performance of the learning control which is biased toward learning regions is curbed. Further, in the same learning region, for example, bias in a learning balance between the learning control of the first constant standby pressure and the learning control of the second constant standby pressure, that is, bias in the order of the learning control, is curbed.

Moreover, according to the present embodiment, when it is impossible to change to the driving state of the vehicle 10 that implements the selected traveling on the current traveling route in the automatic driving control, the current traveling route is changed to another traveling route that implements the selected traveling. Thus, the traveling in which the learning control can be performed in the unconverged region can be implemented.

In addition, according to the present embodiment, while the automatic driving control is being performed, since the current traveling route is changed to another traveling route that implements the selected traveling, the traveling in which the learning control can be performed in the unconverged region can be implemented. Accordingly, the learning control in the unconverged region can be promoted.

Further, according to the present embodiment, while the automatic driving control is being performed, the predetermined driving mode that promotes establishment of the learning permission condition for permitting the learning control of the learning control unit 94 is performed. Thus, the learning control can be performed at an early stage.

As described above, although the embodiment has been described in detail with reference to the drawings, the present disclosure is also applied to other aspects.

For example, in the above-described embodiment, the hydraulic pressure instruction value corresponding to each engagement pressure of the engagement device CB has been exemplified as the operation amount associated with the control of the vehicle 10 corrected by the learning control. However, the present disclosure is not limited to the above aspect. For example, when the method of outputting the MG2 torque $T_m$ including the time of regenerative control is corrected by the learning control, the operation amount associated with the control of the vehicle 10 may be the torque instruction value for the second rotating device MG2.

In addition, in the above-described embodiment, as illustrated in FIGS. 6 and 7, the corrected value of the first constant standby pressure and the corrected value of the second constant standby pressure are stored as learning values in the respective blocks. However, the present disclosure is not limited to the above aspect. For example, the correction amount from the initial value of the first constant standby pressure and the correction amount from the initial value of the second constant standby pressure may be stored as learning values in the respective blocks.

Moreover, in the above-described embodiment, steering is not automatically performed in the automatic driving control that is being performed when the traveling in the driving state of the vehicle 10 corresponding to the unconverged region is preferentially selected. However, the automatic driving control may include cruise control in which acceleration and deceleration is automatically performed, provided that in the case of cruise control, the traveling performance is not changed in response to changing of the traveling route.

Further, in the above-described embodiment, the continuously variable transmission unit 18 may be a gear-shift mechanism in which a differential action can be limited by control of a clutch or a brake connected to the rotating element of the differential mechanism 32. The differential mechanism 32 may be a double pinion-type planetary gear device. The differential mechanism 32 may have four or more rotating elements as a plurality of planetary gear devices are connected to each other. Moreover, the differential mechanism 32 may be a differential gear device in which each of the first rotating device MG1 and the intermediate transfer member 30 is connected to a pinion that is rotationally driven by the engine 14 and a pair of bevel gears that mesh with the pinion. In addition, in a configuration in which two or more planetary gear devices are connected to each other via a part of rotating elements constituting the planetary gear device, the differential mechanism 32 may be a mechanism in which the rotating elements of the planetary gear devices are connected to the engine, the rotating device, and the drive wheel, respectively, in a power transferable manner.

In the above-described embodiment, the vehicle 10 may be a vehicle that is not provided with the continuously variable transmission unit 18 but provided only with the multi-stage transmission unit 20. Alternatively, the vehicle 10 may be a parallel hybrid vehicle in which the power of the engine and the rotating device is transferred to the drive wheels via the automatic transmission. Alternatively, the vehicle 10 may be a series-type hybrid vehicle in which power generated by a generator driven by engine power and/or power of a rotating device driven by battery power is transferred to the drive wheels via the automatic transmission. In such a series-type hybrid vehicle, the engine may be provided so that engine torque is not mechanically transferred to the drive wheels. In other words, in a series-type hybrid vehicle, the engine does not have to be mechanically connected to the drive wheels in a power transferable manner, and does not have to be a power source for traveling. The automatic transmission may be a planetary gear-type automatic transmission, such as the multi-stage transmission unit 20, or a synchronous mesh-type parallel two-shaft automatic transmission, such as the commonly-known dual clutch transmission (DCT) having two input shafts, or the like. Alternatively, the vehicle 10 may be a vehicle that does not include an automatic transmission, for example, a vehicle that does not include an automatic transmission in the above-described series-type hybrid vehicle and an electric vehicle that can travel by a motor as a drive rotating device is driven using battery power. In such an electric vehicle, for example, a method of generating an output torque of the rotating device, including the time of regenerative control, is corrected by learning control. In short, the present disclosure can be applied to any vehicle provided with a power source and a power transfer device.

The above description is only an embodiment, and the present disclosure can be implemented in variously modified and improved aspects based on the knowledge of those skilled in the art.

What is claimed is:

1. A control device of a vehicle provided with a power source and a power transfer device, the control device comprising:
   a driving control unit configured to set a target traveling state, and perform automatic driving control by automatically performing acceleration and deceleration based on the target traveling state; and
   a learning control unit configured to correct, by learning control, an amount of operation associated with control of the vehicle for each of a plurality of learning regions according to a driving state of the vehicle,
   wherein the driving control unit is configured to, while performing the automatic driving control, preferentially select traveling in the driving state of the vehicle corresponding to unconverged regions between:
   (i) the traveling in the driving state of the vehicle corresponding to the unconverged regions in which the correction of the amount of operation is not converged among the plurality of learning regions; and
   (ii) traveling in the driving state of the vehicle corresponding to converged regions in which the correction of the amount of operation is converged among the plurality of learning regions.

2. The control device of the vehicle according to claim 1, wherein the driving control unit is configured to preferentially select traveling in the driving state of the vehicle corresponding to an unperformed region between:
   (i) the traveling in the driving state of the vehicle corresponding to the unperformed region in which the amount of operation has never been corrected among the unconverged regions; and
   (ii) traveling in the driving state of the vehicle corresponding to a performed region in which the amount of operation has been corrected at least one or more times among the unconverged regions.

3. The control device according to claim 1, wherein the driving control unit is configured to change, while performing the automatic driving control, the driving state of the vehicle to the driving state of the vehicle that implements the selected traveling.

4. The control device according to claim 3, wherein the driving control unit is configured to change, when it is impossible to change to the driving state of the vehicle that implements the selected traveling on a current traveling route in the automatic driving control, the current traveling route to another traveling route that implements the selected traveling.

5. The control device according to claim 1, wherein the driving control unit is configured to change, while performing the automatic driving control, a current traveling route to another traveling route that implements the selected traveling.

6. The control device according to claim 1, wherein the driving control unit is configured to perform, while performing the automatic driving control, a predetermined driving mode that promotes establishment of a learning permission condition for permitting a learning control of the learning control unit.

7. A control method of a vehicle provided with a power source and a power transfer device, the control method comprising:

setting a target traveling state, and performing automatic driving control by automatically performing acceleration and deceleration based on the target traveling state; and correcting, by learning control, an amount of operation associated with control of the vehicle for each of a plurality of learning regions according to a driving state of the vehicle, wherein, while performing the automatic driving control, traveling in the driving state of the vehicle corresponding to unconverged regions is preferentially selected between:

(i) the traveling in the driving state of the vehicle corresponding to the unconverged regions in which the correction of the amount of operation is not converged among the plurality of learning regions; and (ii) traveling in the driving state of the vehicle corresponding to converged regions in which the correction of the amount of operation is converged among the plurality of learning regions.

* * * * *